United States Patent

[11] 3,614,598

[72] Inventor Dietrich Meyer
Hamburg, Germany
[21] Appl. No. 36,715
[22] Filed May 13, 1970
[45] Patented Oct. 19, 1971
[73] Assignee U.S. Philips Corporation
New York, N.Y.
[32] Priority May 14, 1969
[33] Germany
[31] P 19 24 783.7

[54] CIRCUIT ARRANGEMENT FOR CONVERTING A RESISTANCE VARIATION INTO A PROPORTIONAL ADMITTANCE VARIATION
9 Claims, 1 Drawing Fig.
[52] U.S. Cl. .................................................. 323/75 N, 323/75 B, 323/75 H, 324/98, 338/2
[51] Int. Cl. .................................................. G01r 17/14
[50] Field of Search ....................................... 323/75 B, 75 H, 75 N; 324/98, 99

[56] References Cited
UNITED STATES PATENTS
3,287,978 11/1966 Knudsen ..................... 323/75 N
3,495,159 2/1970 Smith ........................ 323/75 H
OTHER REFERENCES
Review of Scientific Instruments Vol. 34, Apr. 1963 pgs. 433, 434, 435 Copy in 323/75 H Primary Examiner—Gerald Goldberg
Attorney—Frank R. Trifari ABSTRACT: By connecting two resistors in parallel with one of the arms of a bridge circuit, for example a strain-gauge bridge, and by injecting a compensating current into the junction point of these resistors from a voltage source through a variable resistor, the bridge unbalance to be measured is compensated. For this purpose null amplifier which controls the variable resistor is connected to the measuring diagonal arm of the bridge. A small resistance variation in the bridge is converted, with a high degree of accuracy, into a large admittance variation which can be measured at the supply terminal of the variable resistor.

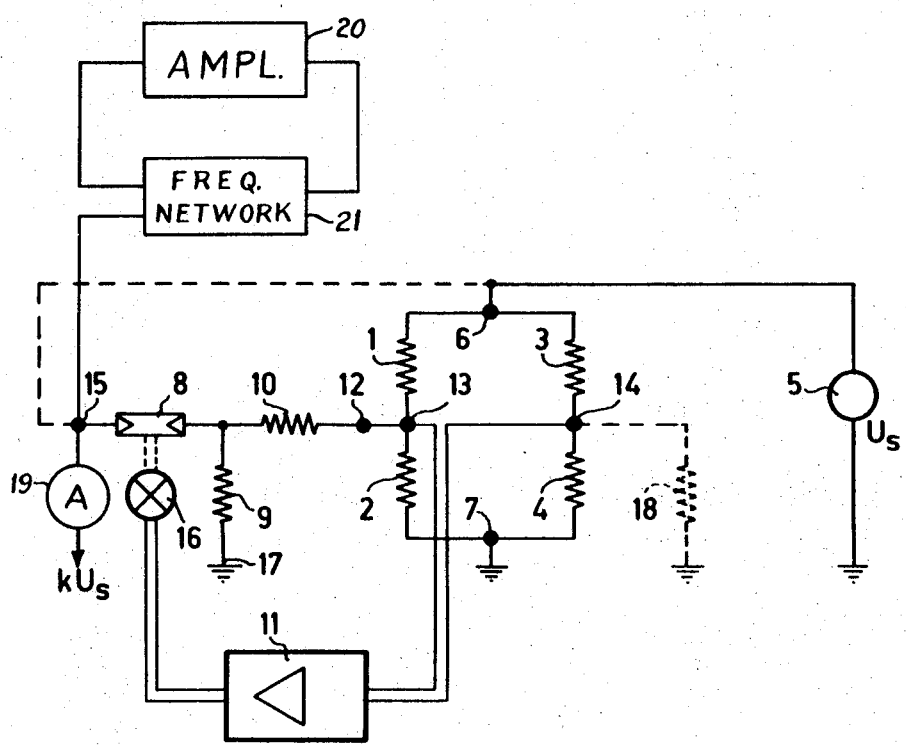
INVENTOR.
DIETRICH MEYER
BY
AGENT

CIRCUIT ARRANGEMENT FOR CONVERTING A RESISTANCE VARIATION INTO A PROPORTIONAL ADMITTANCE VARIATION

This invention relates to a circuit arrangement for converting a small resistance variation into a proportionally large admittance variation, which arrangement comprises a bridge circuit which is energized from a first voltage source and a device which is controlled by the output voltage of the bridge circuit and is intended for automatically compensating for unbalance of the bridge by means of a network connected in parallel with an arm of the bridge. Such a circuit arrangement is particularly suitable for controlling oscillators the output frequency of which is a measure of the unbalance in a resistance bridge. The purpose of such circuit arrangements is to convert the very small resistance variations of some measured-value transducers into readily measurable signals which are reliable for long-distance transmission.

Circuit arrangements of the aforementioned type are known, for example, from an article in the Philips Technical Review, Vol. 29, No. 6, pages 193–194. In the arrangement described a resistor which can be electronically influenced is controlled by a regulating circuit so that a current or voltage derived from the resistance compensates for the generally very small out-of-balance condition of a resistance bridge. The said resistance also forms part of a network the input resistance or input admittance of which is varied in proportion to the out-of-balance condition of the bridge.

These circuit arrangements suffer from the disadvantages that the said large input resistance or input admittance is not accurately linear with the out-of-balance condition of the bridge, and usually the difference of two voltages of different potentials is required to be determined and the compensating part has to include active elements such as operational amplifiers. The circuit arrangement according to the invention largely avoids these disadvantages and for this purpose it is characterized in that the network comprises the series combination of two resistors (9, 10), and that there is connected to the junction point of the resistors a further resistor (8) which can be varied by the automatic compensation device (11) the other end of the resistor being connected to a second voltage source ($kU_s$).

In an embodiment of a circuit arrangement according to the invention the adjustable resistor is a photoresistor which can be illuminated by a source of light (16) connected to the output of the automatic compensation device (11).

The second voltage source may alternatively be identical with the first voltage source.

An embodiment of the invention will now be described, by way of example, with reference to the accompanying diagrammatic drawing, in which:

The sole FIGURE is a circuit diagram of a circuit arrangement according to the invention.

A known resistance bridge comprises resistors 1, 2, 3 and 4. The bridge is fed at opposite points 6 and 7 by a voltage source 5. The circuit arrangement further includes a T-section comprising a variable series resistor, 8, a fixed parallel resistor 9 and a fixed series resistor 10. A compensation amplifier 11 is provided for controlling the first series resistor 8. An output terminal 12 of the T-section is connected to a terminal 13 of the diagonal arm of the bridge, and an output terminal 15 of the T-section is connected to a voltage source supplying a voltage $k \cdot U_s$. The latter voltage has a fixed relationship $k$ to the bridge supply voltage $U_s$ (where $k$ may be unity). The connection of this T-section to the bridge results in that the bridge is also subject to an unbalance due to the variable resistor 8. This additional unbalance condition, however, can be adjusted so that an out-of-balance condition caused by the four bridge resistors 1, 2, 3 and 4 is counteracted or even compensated. For this purpose, the amplification of the compensation amplifier may be made such that the series resistor 8 is always adjusted so that the voltage across the diagonal arm of the bridge, i.e. the input voltage of the amplifier, substantially always is zero.

The variable resistor 8 may be a photoresistor having a resistance determined *inter alia* by the luminous flux of a light source the luminance of which is controlled by the output voltage or output current of the compensation amplifier 11. This circuit arrangement produces the desired result i.e. the admittance at the input of the T-section (measured between points 15 and 17) is proportional to the original out-of-balance condition of the bridge with a high degree of accuracy.

The truth of the above statement will now be proved with reference to the following computation. Each pair of diagonally opposite resistors will increase or decrease with the same polarity, as is known from the technology of strain-gauge bridges:

$$R_2 = R_3 = R_B + \Delta R_B,$$
$$R_1 = R_4 = R_B - \Delta R_B.$$

At balance a network computation shows the following exact result:

$$G_E = \frac{1}{k \cdot R_9} \left[ \frac{\Delta R_B}{R_B} \left( \frac{R_9 + R_{10}}{R_B} \cdot \frac{2}{1 - \frac{\Delta R_B^2}{R_B^2}} + \frac{1}{2} \right) + \frac{1}{2} \right]$$

where $G_E$ is the input admittance of the T-section and $R_9$ is the resistance of the resistor 9. The deviation from the desired linear function relating the admittance $G_E$ to the bridge unbalance $\Delta R_B/R_B$ is expressed by the term $(1 - \Delta R^2_B/R^2_B)$. However, this deviation is considerably smaller than the term $(1 - \Delta R_B/R_B)$, i.e. the deviation found in known circuit arrangements. In a practical embodiment the maximum out-of-balance factor $\Delta R_B/R_B$ in a strain-gauge bridge is 1/1000. In the latter case the linearity deviation is $10^{13}$, but in the proposed circuit arrangement it is $10^{16}$. A constant term due to the asymmetry of the circuit arrangement $$\left(\text{in the equation } \frac{1}{k \cdot R_9} \cdot \frac{1}{2}\right)$$

can be eliminated by connecting a resistor 18 of value $R_9 + R_{10}$ between the points 14 and 17. Further, by means of such a resistor or resistance network a given desired additive constant may be added to the $G_E$ equation. Another possibility of adding a desired additive constant or of eliminating an undesired additive constant is to connect a resistor between the junction point of the T-section and the first or second voltage source $U_s$ or $kU_s$ respectively. Also, the resistance bridge may be fed from a symmetrical voltage source.

If the values of the network resistors, especially the resistors 9 and 10, are suitably chosen, an out-of-balance factor $\Delta R_B/R_B$ of say 1/1000 may cause a variation of the input admittance of the T-section of 1:10. This large variation can be measured simply and accurately, even from a large distance, by including, for example, a current meter 19 between the second supply source and the input of the T-section and maintaining the supply constant. For in this case the input current $i_E$ to be measured is:

$$i_E = k \cdot U_s \cdot G_E,$$

i.e. a linear measure of the input admittance and hence a linear measure of the bridge unbalance $\Delta R_B/R_B$. Such a circuit is highly reliable and accurate because, with the exception of the compensation amplifier 11, only passive circuit elements are used. Changes in this amplifier as well as nonlinearity and temporary variations in the operating line of the variable resistor 8 are eliminated because these components are connected in a regulating loop.

A further highly interesting use of the circuit arrangement according to the invention is to combine it with an oscillator comprising, for example, an amplifier 20 and a frequency-determining network 21. The small bridge unbalance now produces a comparatively large variation in the tuning of the oscillator frequency. For this purpose, a known RC oscillator circuit may be used which is linearly controllable in frequency, for example, by means of the admittance of a single resistor. The input resistance of the T-section now replaces the resistance of the frequency-determining network of the oscillator. Frequently it will be possible to take the supply voltage for the resistance bridge directly from the oscillator.

Measuring devices of the aforedescribed type can be used to great advantage in those cases in which the quantity to be measured, after being converted into electrical values by a transducer, is to be transmitted over a large distance for purposes of measurement, regulation or supervision, because a frequency which ultimately contains the quantity can be transmitted free from interference.

What is claimed is:

1. A circuit arrangement for converting a small resistance variation into a proportional large admittance variation comprising, a first voltage source, a bridge circuit which is energized by said first voltage source, a network connected in parallel with an arm of the bridge circuit, a compensation device which is controlled by the output voltage of the bridge circuit and is arranged to automatically compensate for unbalance of the bridge by means of the network connected in parallel with the bridge arm, characterized in that the network comprises the series combination of two resistors having a junction point which is connected to a further resistor arranged to be adjusted by the automatic compensation device, a second voltage source, and means connecting the other end of said further resistor to the second voltage source 2. A circuit arrangement as claimed in claim 1 further comprising a source of light connected to the output of the automatic compensation device, characterized in that the variable resistor comprises a photoresistor arranged to be illuminated by said source of light connected to the output of the automatic-compensation device.

3. A circuit arrangement as claimed in claim 1 characterized in that the second voltage source is identical with the first voltage source.

4. A circuit arrangement as claimed in claim 1 further comprising a third resistor connected in parallel with another arm of the bridge.

5. A circuit arrangement as claimed in claim 1 further comprising a current meter included in the lead connecting the second voltage source to the variable resistor.

6. A circuit arrangement as claimed in claim 1 further comprising means connecting the junction point of the variable resistor and the second voltage source to an oscillator circuit so that the input resistance of the network determines the frequency of the oscillator.

7. A circuit arrangement as claimed in claim 1 wherein the elements of the bridge circuit comprise strain-dependent resistance elements.

8. A circuit arrangement as claimed in claim 2 further comprising a third resistor connected in parallel with another arm of the bridge circuit.

9. A circuit arrangement as claimed in claim 2 wherein the elements of the bridge circuit comprise strain-dependent resistance elements.